United States Patent
Song

(10) Patent No.: US 7,311,315 B2
(45) Date of Patent: Dec. 25, 2007

(54) APPARATUS FOR CONTROLLING STIFFNESS OF ANTI-ROLL BAR FOR VEHICLE

(75) Inventor: June Young Song, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 313 days.

(21) Appl. No.: 11/024,764

(22) Filed: Dec. 30, 2004

(65) Prior Publication Data

US 2005/0275172 A1 Dec. 15, 2005

(30) Foreign Application Priority Data

Jun. 11, 2004 (KR) .................. 10-2004-0042941

(51) Int. Cl.
*B60G 17/015* (2006.01)
(52) U.S. Cl. .............. 280/5.511; 280/5.51; 280/5.519; 280/124.166; 280/5.508
(58) Field of Classification Search ............ 280/5.511, 280/5.51, 5.508, 5.515, 5.519, 124.166
See application file for complete search history.

(56) References Cited

U.S. PATENT DOCUMENTS

| | | | | |
|---|---|---|---|---|
| 4,796,911 A | * | 1/1989 | Kuroki et al. | 280/5.511 |
| 5,390,949 A | * | 2/1995 | Naganathan et al. | 280/5.515 |
| 5,556,083 A | * | 9/1996 | Furihata et al. | 267/277 |
| 6,149,166 A | * | 11/2000 | Struss et al. | 280/5.511 |

* cited by examiner

*Primary Examiner*—Eric Culbreth
(74) *Attorney, Agent, or Firm*—Greenblum & Bernstein, P.L.C.

(57) ABSTRACT

An apparatus for controlling stiffness of an anti-roll bar for a vehicle includes an anti-roll bar provided with piezoelectric ceramics, the anti-roll bar interconnecting both lower arms of a vehicle suspension system, a power converter connected to a power supply to change an amount of electric power and to supply the electric power to the piezoelectric ceramics of the anti-roll bar, and a controller connected to the power converter to calculate an amount of the electric power needed for providing the piezoelectric ceramics with optimal stiffness based on previously stored vehicle speed and steering angle in response to data detected by a vehicle speed sensor and a steering angle sensor and to control the power converter such that the calculated electric power can be supplied to the piezoelectric ceramics.

1 Claim, 2 Drawing Sheets

APPARATUS FOR CONTROLLING STIFFNESS OF ANTI-ROLL BAR FOR VEHICLE

RELATED APPLICATIONS

The present disclosure relates to subject matter contained in Korean Application No. 10-2004-0042941, filed on Jun. 11, 2004, which is herein expressly incorporated by reference its entirety.

BACKGROUND OF THE INVENTION

1. Field of the Invention

The present invention relates to an apparatus for controlling stiffness of an anti-roll bar for a vehicle, and more particularly, to an apparatus wherein piezoelectric ceramics are added to an anti-roll bar to allow the anti-roll bar to be controlled to exhibit its optimum stiffness according to vehicle conditions including vehicle speed and steering angle such that the driving stability and product value of vehicle can be maximized.

2. Description of the Background Art

In general, an anti-roll bar for a vehicle is a major element of the vehicle suspension system and is called a stabilizer. The anti-roll bar is configured to allow a central portion of a steel rod bent into a general 'C' shape to function as a torsion bar, and serves to cause no additional action when right and left wheels are simultaneously moved in a vertical direction and to increase its torsional stiffness due to its twisting operation when there is a difference between the vertical strokes of the right and left wheels.

In particular, when a vehicle body is subjected to rolling, the anti-roll bar functions as an auxiliary spring for causing spring action in response to the difference between the vertical strokes of the right and left wheels and is used to control steering characteristics since it can reduce the rolling and change the rolling stiffness of the right and left wheels.

That is, an anti-roll bar functions in such a manner that the degree of understeer is increased if the stiffness of a front anti-roll bar is increased while the degree of understeer is decreased if the stiffness of a rear anti-roll bar is increased.

FIG. 1 is a front view of a related art vehicle suspension system.

As shown in FIG. 1, a related art vehicle suspension system 20 absorbs vibration or shock transmitted to a vehicle body through tires at both sides thereof. In particular, lower arms 21, which are elements of the suspension system 20, are connected to the tires, respectively, and the both lower arms 21 are interconnected with each other through an anti-roll bar 10.

Therefore, the anti-roll bar 10 can reduce the rolling occurring when the vehicle travels along a curved road.

However, since the related art anti-roll bar for a vehicle is designed and used to exhibit constant stiffness, the stiffness of the anti-roll bar cannot be changed in accordance with rapidly changing vehicle driving conditions such as vehicle speed and steering angle. Thus, there is a problem in that the driving comfort or stability can be deteriorated due to the anti-roll bar with constant stiffness.

SUMMARY OF THE INVENTION

The present invention is conceived to solve the aforementioned problems in the prior art. An object of the present invention is to provide a vehicle suspension system wherein electric power applied to piezoelectric ceramics of an anti-roll bar of a vehicle can be adjusted in accordance with vehicle driving conditions such as vehicle speed and steering angle to allow the anti-roll bar to be controlled to have optimum stiffness according to the vehicle driving conditions such that the driving stability and product value of the vehicle can be maximized.

According to an aspect of the present invention, there is provided an apparatus for controlling stiffness of an anti-roll bar, comprising an anti-roll bar which includes piezoelectric ceramics and interconnects both lower arms of a vehicle suspension system, a power converter which is connected to a power supply to change an amount of electric power and to supply the electric power to the piezoelectric ceramics of the anti-roll bar, and a controller which is connected to the power converter to calculate an amount of the electric power needed for providing the piezoelectric ceramics with optimal stiffness based on previously stored vehicle speed and steering angle in response to data detected by a vehicle speed sensor and a steering angle sensor and to control the power converter such that the calculated electric power can be supplied to the piezoelectric ceramics.

BRIEF DESCRIPTION OF THE DRAWINGS

The above and other objects, features and advantages of the present invention will become apparent from the following description of preferred embodiments in conjunction with the accompanying drawings, in which.

DETAILED DESCRIPTION OF THE INVENTION

Hereinafter, a preferred embodiment of the present invention will be described in detail with reference to the accompanying drawings.

Figure 1:
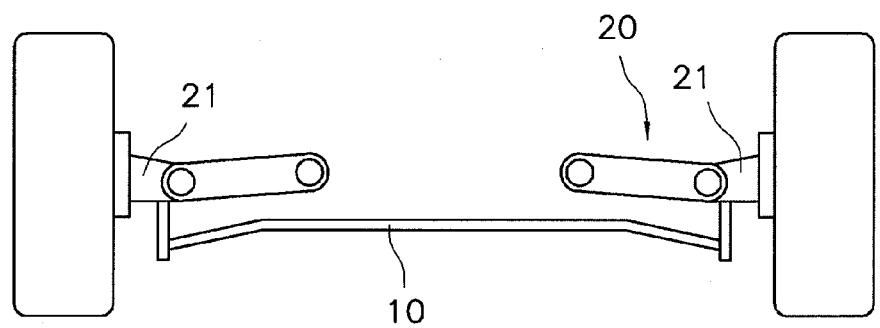
FIG. 1 is a front view of a related art vehicle suspension system.
Figure 2:
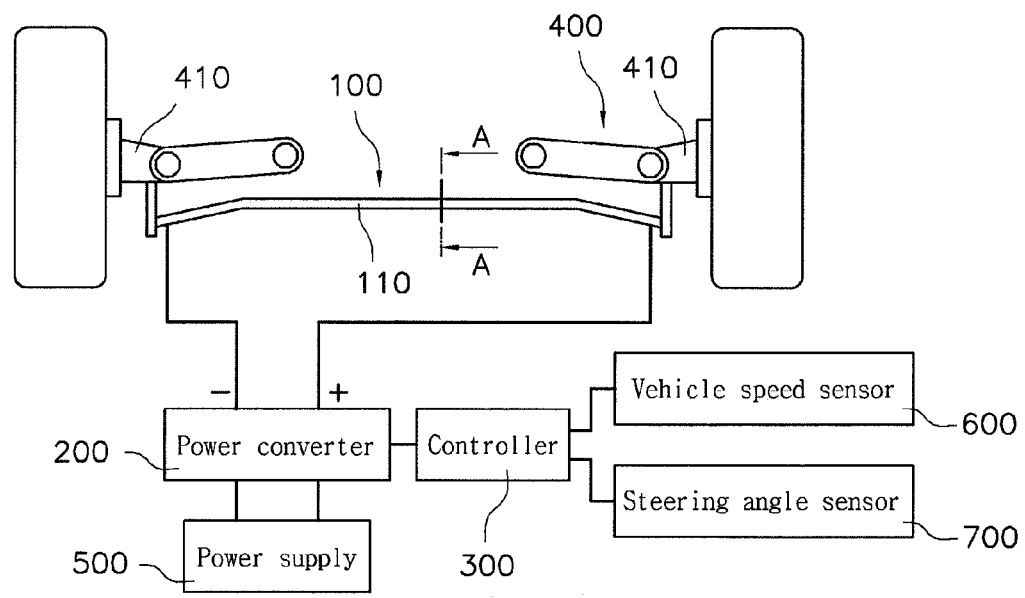
FIG. 2 is a front view schematically showing the configuration of an apparatus for controlling stiffness of an anti-roll bar for a vehicle according to the present invention.
Figure 3:
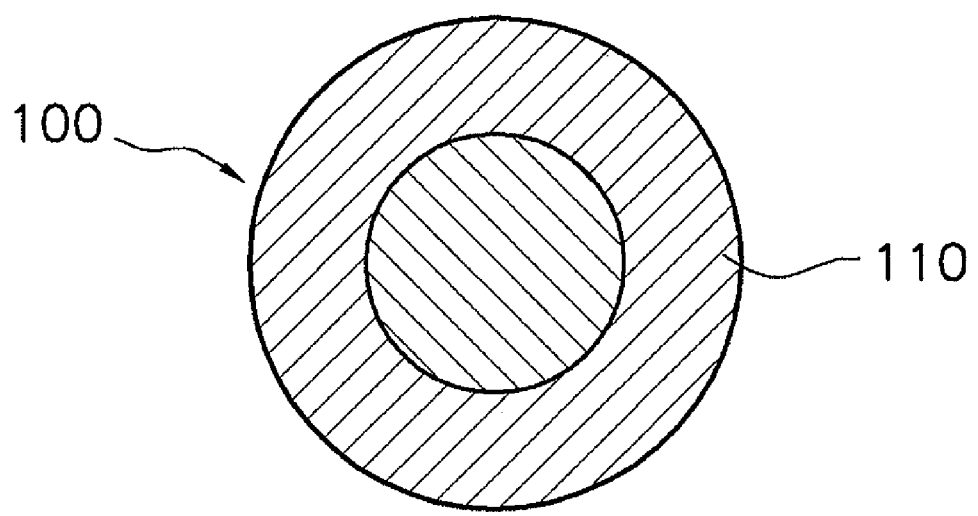
FIG. 3 is a sectional view taken along line A-A of FIG. 2.

FIG. 2 is a front view schematically showing the configuration of an apparatus for controlling stiffness of an anti-roll bar for a vehicle according to the present invention, and FIG. 3 is a sectional view taken along line A-A of FIG. 2.

As shown in FIGS. 2 and 3, the apparatus for controlling stiffness of an anti-roll bar for a vehicle includes an anti-roll bar 100 which includes piezoelectric ceramics 110 and interconnects both lower arms 410 of a vehicle suspension system 400, a power converter 200 which is connected to a power supply 500 to change an amount of electric power and to supply the electric power to the piezoelectric ceramics 110 of the anti-roll bar 100, and a controller 300 which is connected to the power converter 200 to calculate an amount of the electric power needed for providing the piezoelectric ceramics 110 with optimal stiffness based on previously stored vehicle speed and steering angle in response to data detected by a vehicle speed sensor 600 and a steering angle sensor 700 and to control the power converter 200 such that the calculated electric power can be supplied to the piezoelectric ceramics 110.

Hereinafter, the operation of the present invention will be described with reference to FIGS. 2 and 3.

As shown in FIG. 2, the apparatus for controlling stiffness of the anti-roll bar according to the present invention so configured is the same as that of the related art in view of their installation positions, but the present invention is different from the related art in that the anti-roll bar 100 of the present invention includes the piezoelectric ceramics 110 and can control the supply of electric power such that the anti-roll bar 100 provided with the piezoelectric ceramics 110 exhibits predetermined stiffness suitable for the driving conditions.

At this time, the anti-roll bar 100 is preferably configured in such a manner that its outer circumferential surface be enclosed by the piezoelectric ceramics 110, as shown in FIG. 3.

In general, when an external force is applied to an ion crystal in a specific direction, one side thereof is positively charged and the other is negatively charged due to internal stress produced therein. Thus, a voltage is created in the crystal. This phenomenon is called a positive piezoelectric effect. On the other hand, when an external voltage is applied to a crystal, the crystal is deformed or distorted. This phenomenon is called a negative piezoelectric effect.

That is, according to the piezoelectric effect, a mechanical force (stress) is converted into an electrical signal (voltage), and vice versa. A material having such a piezoelectric property is called piezoelectrics, and such a piezoelectric material made of ceramics is called piezoelectric ceramics 110.

Therefore, the aforementioned piezoelectric ceramics 110 uses the principle that when electric power is applied thereto, stress is created in the piezoelectric ceramics 110 and the stiffness of the piezoelectric ceramics 110 is changed accordingly. For example, the stiffness of the piezoelectric ceramics 110 is increased when large electric power is applied thereto, while the stiffness is decreased when relatively small electric power is applied thereto.

As shown in FIG. 2, the piezoelectric ceramics 110 is also connected to the power converter 200 for increasing or decreasing the power supplied from the power supply 500 such as a battery in the vehicle, and the power converted 200 is controlled by the controller 300.

That is, the magnitude of electric power supplied to the piezoelectric ceramics 110 can be controlled under the control of the controller 300.

Further, the controller 300 is connected to the vehicle speed sensor 600 for measuring vehicle speed and transmitting the detected vehicle speed to the controller in the form of a corresponding electrical signal, and the steering angle sensor 700 for measuring a steering angle made by a driver and transmitting the detected steering angle to the controller in the form of a corresponding electrical signal.

Furthermore, data on the optimal stiffness that the anti-roll bar 100 should exhibit in response to the detected vehicle speed and steering angle are beforehand stored in the controller 300, and data on the electric power that should be accordingly supplied to the piezoelectric ceramics 110 of the anti-roll bar 100 are also beforehand stored.

Therefore, the controller 300 can control the power converter 200 such that the piezoelectric ceramics 110 of the anti-roll bar 100 can exhibit the optimal stiffness in response to a current vehicle speed detected by the vehicle speed sensor 600 and a current steering angle detected by the steering angle sensor 700. Then, suitable electric power can be supplied to the anti-roll bar 100, and consequently, the anti-roll bar 100 can exhibit optimal stiffness corresponding to current driving conditions.

At this time, it is preferred that the power converter 200 can increase or decrease the voltage supplied to the piezoelectric ceramics 110.

Therefore, since the apparatus for controlling stiffness of an anti-roll bar for a vehicle according to the present invention can actively change the stiffness of the anti-roll bar 100 suitably in accordance with the vehicle speed and steering angle, the anti-roll bar 100 can exhibit stiffness suitable for the vehicle driving conditions. Thus, there is an advantage in that both the driving stability and product value of vehicle can be greatly enhanced.

According to the present invention so configured, the vehicle speed and steering angle can be adjusted in accordance with the electrical power supplied to the piezoelectric ceramics of the anti-roll bar such that the anti-roll bar can be controlled to exhibit optimal stiffness suitable for the driving conditions. Therefore, the driving stability and product value of vehicle can be maximized.

What is claimed is:

1. An apparatus for controlling stiffness of an anti-roll bar for a vehicle, comprising:
    an anti-roll bar having piezoelectric ceramics formed therewith, the anti-roll bar interconnecting lower arms of a vehicle suspension system;
    a power converter connected to a power supply to change an amount of electric power and to supply the electric power to the piezoelectric ceramics of the anti-roll bar; and
    a controller connected to the power converter to calculate an amount of the electric power needed to provide the piezoelectric ceramics with optimal stiffness based on previously stored vehicle speed and steering angle in response to data detected by a vehicle speed sensor and a steering angle sensor and to control the power converter such that the calculated electric power can be supplied to the piezoelectric ceramics, wherein the anti-roll bar is configured such that an outer circumferential surface thereof is enclosed by the piezoelectric ceramics.

* * * * *